United States Patent
Hamada

(10) Patent No.: US 6,869,192 B2
(45) Date of Patent: Mar. 22, 2005

(54) PROJECTOR WITH IMPROVED FOCUS RING

(75) Inventor: Shingo Hamada, Daito (JP)

(73) Assignee: Funai Electric Co., Ltd., Daito (JP)

( * ) Notice: Subject to any disclaimer, the term of this patent is extended or adjusted under 35 U.S.C. 154(b) by 0 days.

(21) Appl. No.: 10/622,243

(22) Filed: Jul. 18, 2003

(65) Prior Publication Data

US 2004/0021836 A1 Feb. 5, 2004

(30) Foreign Application Priority Data

Jul. 31, 2002 (JP) .................................. 2002-004772 U

(51) Int. Cl.$^7$ .......................... G03B 3/00; G03B 21/14; G03B 21/22; G02B 7/02
(52) U.S. Cl. ...................... 353/101; 353/119; 359/830; 359/808
(58) Field of Search ................................ 353/119, 122, 353/100, 101; 359/694–706, 721, 819, 811, 821–830, 808; 349/5, 7, 9; 396/71

(56) References Cited

U.S. PATENT DOCUMENTS

| 4,154,510 | A | * | 5/1979 | Katagiri ...................... 359/826 |
| 5,737,119 | A | * | 4/1998 | Mladjan et al. ............. 359/353 |
| 5,940,228 | A | * | 8/1999 | Burnett ........................ 359/825 |
| 6,364,491 | B1 | * | 4/2002 | Okada et al. ................ 353/101 |
| 6,536,906 | B2 | * | 3/2003 | Fujimori et al. ............ 353/119 |
| 6,573,950 | B1 | * | 6/2003 | Hirata et al. ................ 348/744 |

FOREIGN PATENT DOCUMENTS

| JP | 2001-215382 | 8/2001 | ............ G02B/7/04 |
| JP | 2002-107611 | 4/2002 | ............ G02B/7/10 |

OTHER PUBLICATIONS

Patent Abstracts of Japan, Publication No. 2001215382 A, Publication Date Aug. 10, 2001, 1 page.
Japanese Search Report dated Oct. 1, 2002 with English translation, 5 pages.
Patent Abstracts of Japan, Japanese Application No: 2002–107611; Publication Date: Apr. 10, 2002, 2 pages.

* cited by examiner

Primary Examiner—Judy Nguyen
Assistant Examiner—Andrew Sever
(74) Attorney, Agent, or Firm—Osha & May L.L.P.

(57) ABSTRACT

A rib, provided on an outer periphery of a projection ring, includes: a first rib extending along a direction in which an optical axis of a lens main body extends (an attachment direction of a focus lens); and a second rib, brought into contact with one end of first rib, extending along a direction approximately orthogonal to first rib so as to have one side and the other side. On the other hand, a protrusion, provided on an inner periphery of the cylindrical focus ring, includes a pair of protrusion parts arranged with a spacing in a direction in which an optical axis extends. With this structure, it is possible to obtain a projector having a focus ring capable of being easily attached to a lens main body and being easily molded.

6 Claims, 6 Drawing Sheets

PROJECTOR WITH IMPROVED FOCUS RING

BACKGROUND OF THE INVENTION

1. Field of the Invention

The present invention relates to a projector and, particularly, to a projector having a focus ring.

2. Description of the Background Art

There has been a projector as one of devices for projecting a picture on a screen. A lens main body for projecting a picture is attached to the projector. As shown in FIG. 10, a focus ring 102 is generally attached to a lens main body 105. Lens main body 105 with focus ring 102 has a diameter larger than that of lens main body 105 without focus ring 102, thereby easily achieving focusing.

In lens main body 105, a lens itself is attached to a projection ring 103. Projection ring 103 is provided with a protrusion 103a protruded outwardly.

On the other hand, focus ring 102 is provided with a slit 104 for receiving protrusion 103a. Slit 104 includes: an opening 102a for receiving protrusion 103a; and a passage 102b which is narrower than opening 102a. Focus ring 102 is generally made of resin.

Next, description will be given of a procedure of attaching focus ling 102. First, an entering portion of passage 102b of focus ring 102 is brought into contact with protrusion 103a from a direction shown by an arrow mark, and focus ring is pushed in the same direction. At this time, passage 102b is widened, so that protrusion 103a passes through passage 102b and is received by opening 102a.

With this structure, focus ring 102 is attached and fixed to projection ring 103. In this state, focus ring is turned in a circumferential direction, so that lens main body is also turned. As a result, focusing can be achieved in the projector.

However, the conventional projector has the following problems. As shown in FIG. 10, when focus lens 102 is attached to lens main body 105, focus lens 102 has to be positioned in the circumferential direction such that the position of slit 104 coincides with that of protrusion 103a.

Therefore, in the case where it is difficult to observe the position of protrusion 103 from the outside of the projector, it takes a long time to attach focus lens 102 to lens main body 105 in some cases.

In addition, as shown in FIG. 11, in the case where focus ring is molded with resin, a die 114 is used for particularly molding opening 102a. As shown in FIG. 12, since three slits 104 are provided on focus ring 102 in the circumferential direction, die 114 has to be detached in three directions as shown by arrow marks 111, 112, 113, respectively. Therefore, a problem has arisen in that the structure of the die is complicated.

SUMMARY OF THE INVENTION

The present invention is made to solve the above-described problems, and an object thereof is to provide a projector having a focus ring capable of being easily attached to a lens main body and being easily molded.

According to an aspect of the present invention, a projector for projecting a picture on a surface to be projected includes a projector main body, a lens unit for projecting a picture, a cylindrical focus ring, a first rib, a second rib and a pair of protrusion parts. The cylindrical focus ring is inserted along a direction in which an optical axis of the lens unit extends, is attached in such a manner as to surround an outer periphery of the lens unit in a circumferential direction, and is molded with resin. The first rib is provided on the outer periphery of the lens unit, and extends along a direction in which the optical axis extends. The second rib is brought into contact with one end of the first rib, and extends along a direction approximately orthogonal to the first rib so as to have one side and the other side. The pair of protrusion parts is provided on an inner periphery of the cylindrical focus ring, and is arranged with a spacing in a direction approximately orthogonal to the direction in which the optical axis extends. The first rib is sandwiched between the pair of protrusion parts in the circumferential direction and, also, the second rib is engaged with the pair of protrusion parts along the optical axis, whereby the focus ring is fixed to the lens unit.

With this structure, the focus ring is inserted into the lens main body at an optional position without specifying the position of the pair of protrusion parts formed on the focus ring in the circumferential direction and the focus ring is turned, whereby the first rib is sandwiched between the pair of protrusion parts. Therefore, the movement of the focus ring in the circumferential direction is restricted with respect to the lens body. In addition, in this state, the second rib is brought into contact with and engaged with the backward portion of the pair of protrusion parts in the insertion direction, whereby the movement of the focus ring in the optical axis direction is restricted with respect to the lens main body. As a result, it is possible to easily fix the focus ring to the lens main body. In addition, the structure has no necessity to provide an opening for receiving a protrusion in a circumferential direction like a focus ring of the conventional projector, and makes it possible to further simplify the structure of a die for molding a focus ring.

According to another aspect of the present invention, a projector for projecting a picture on a surface to be projected includes a lens unit for projecting a picture, and a cylindrical focus ring. The cylindrical focus ring is inserted along a direction in which an optical axis of the lens unit extends and is attached in such a manner as to surround an outer periphery of the lens unit in a circumferential direction. One portion of one of the focus ring and the lens unit is sandwiched between another portions of one of the focus ring and the lens unit and, also, the one portion is engaged with the another portions along the optical axis, whereby the focus ring is fixed to the lens unit.

With this structure, the focus ring is inserted into the lens main body at an optional position without specifying the position of the pair of protrusion parts formed on the focus ring in the circumferential direction and the focus ring is turned, whereby the one portion is sandwiched between the another portions in the circumferential direction. Therefore, the movement of the focus ring in the circumferential direction is restricted with respect to the lens body. In addition, in this state, the one portion is engaged with the another portions along the optical axis, whereby the movement of the focus ring in the optical axis direction is restricted with respect to the lens main body. As a result, it is possible to easily fix the focus ring to the lens main body.

Specifically, it is preferable that a first rib extending along the direction in which the optical axis extends and a second rib, brought into contact with one end of the first rib, extending along a direction approximately orthogonal to the first rib so as to have one side and the other side are formed on the one portion, and a pair of protrusion parts arranged with a spacing in a direction approximately orthogonal to the direction in which the optical axis extends is formed on the another portions.

In this case, the first rib is sandwiched between the pair of protrusion parts, whereby the movement of the focus ring in the circumferential direction is restricted with respect to the lens main body. In addition, the second rib is brought into contact with and engaged with the backward portion of the pair of protrusion parts in the insertion direction, whereby the movement of the focus ring in the optical axis direction is restricted with respect to the lens main body.

Preferably, the pair of protrusion parts are formed in the shape of approximately arc along the optical axis.

With this structure, the focus ring can be comparatively easily detached from the lens main body by pulling out focus ring fixed to lens main body in a direction opposite to the attachment direction.

Preferably, the focus ring is molded with resin.

With this structure, a portion, on which a protrusion is formed at the time of attaching the focus ring to the lens main body, is flexed, so that the focus ring can be easily fixed to the lens main body. In addition, the structure has no necessity to provide an opening for receiving a protrusion in a circumferential direction like a focus ring of the conventional projector, and makes it possible to simplify the structure of a die for molding a focus ring.

Preferably, the resin is heat resistant.

With this structure, it is possible to suppress the focus ring from easily deforming due to the heat generated at the time of projecting a picture.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
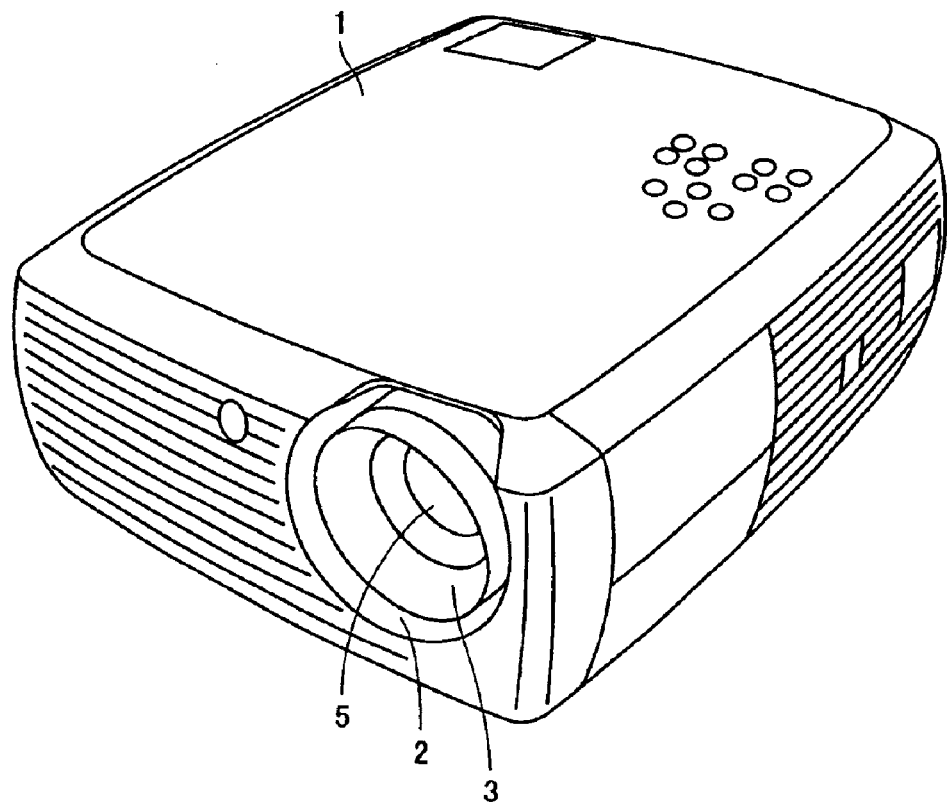
FIG. 1 is a perspective view showing a projector according to an embodiment of the present invention.

Description will be given of a projector according to an embodiment of the present invention. As shown in FIG. 1, a focus ring 2 is attached to a lens main body 5 of a projector 1 through a projection ring 3.

Figure 2:
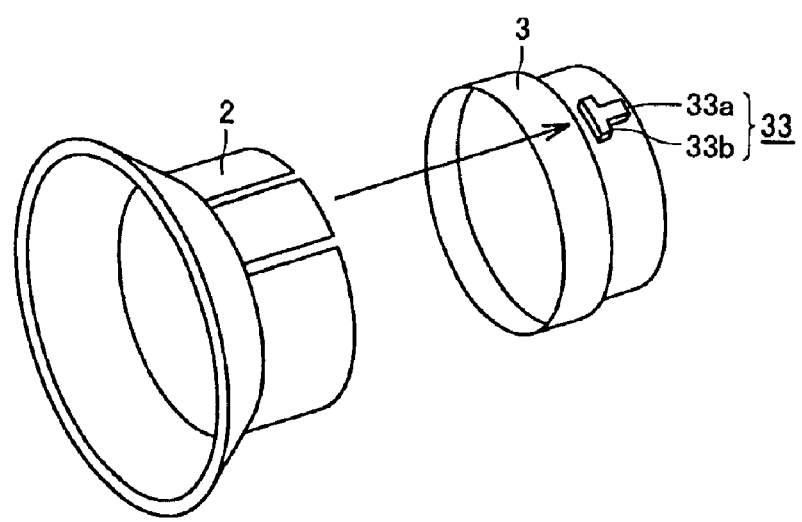
FIG. 2 is a perspective view showing a focus ring attached to the projector shown in FIG. 1, and a projection ring in the same embodiment.

As shown in FIG. 2, a prescribed rib 33 is provided on an outer periphery of projection ring 3. Rib 33 includes: a first rib 33a extending along a direction in which an optical axis of lens main body 5 extends (an attachment direction of focus ring 2); and a second rib 33b, brought into contact with one end of first rib 33a, extending along a direction approximately orthogonal to first rib 33a so as to have one side and the other side.

Figure 3:
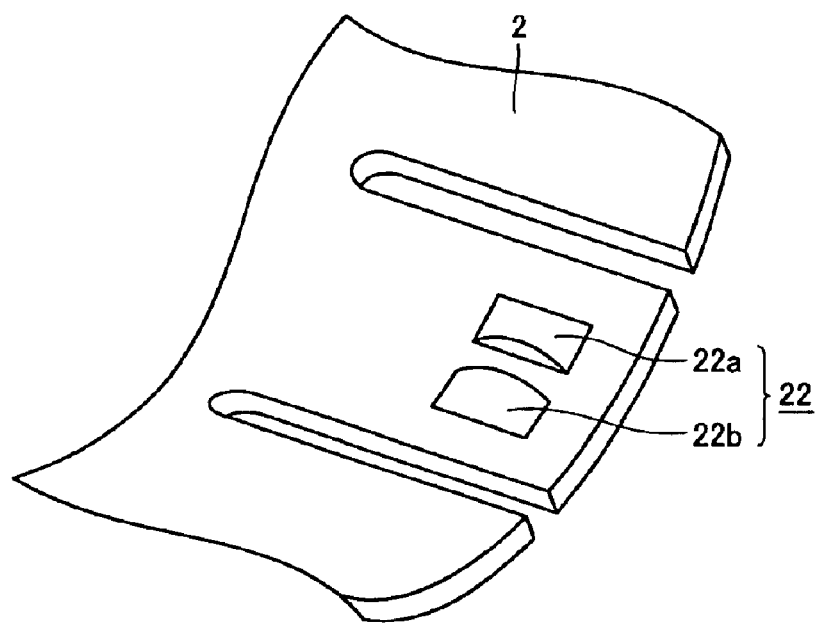
FIG. 3 is a partly enlarged perspective view showing the focus ring shown in FIG. 2 in the same embodiment.

On the other hand, as shown in FIG. 3, a prescribed protrusion 22 is provided on an inner periphery of cylindrical focus ring 2. Protrusion 22 includes a pair of protrusion parts 22a, 22b arranged with a spacing in a direction approximately orthogonal to the direction in which the optical axis extends. The pair of protrusion parts 22a, 22b is formed in the shape of approximately arc along the optical axis.

Figure 4:
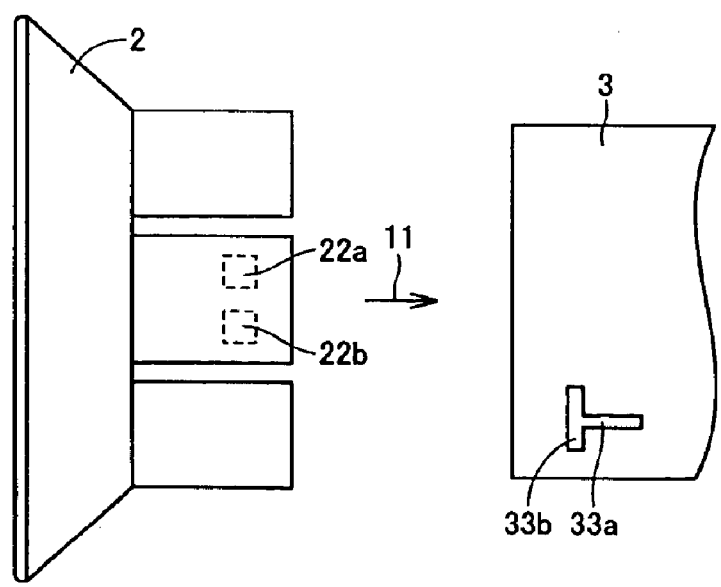
FIG. 4 is a first view for describing a procedure of attaching the focus ring in the same embodiment.

Next, description will be given of a procedure of attaching focus ring 2 to projection ring 3. As shown in FIG. 4, focus ring 2 is inserted into a prescribed portion of projection ring 3 as shown by an arrow mark 11 at an optional position of protrusion 22 in a circumferential direction.

Figure 5:
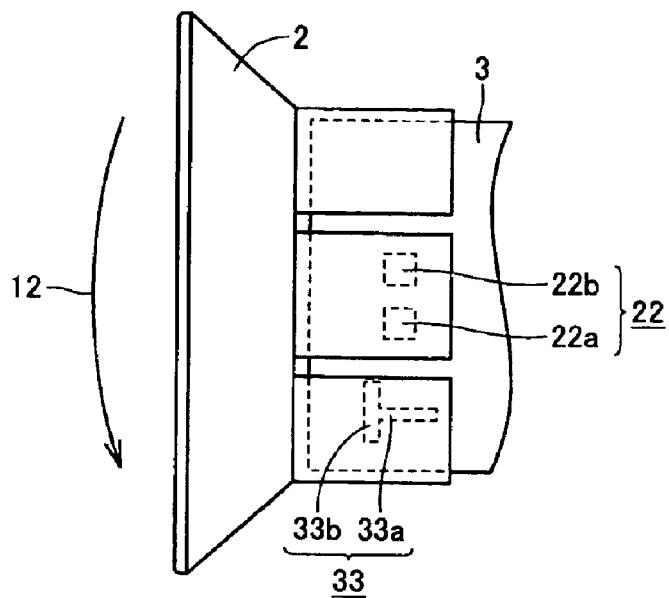
FIG. 5 is a second view for describing the procedure of attaching the focus ring in the same embodiment.

Then, as shown in FIG. 5, focus ring 2 is turned around projection ring 3 in a direction shown by an arrow mark 12, for example. Thus, protrusion part 22a of the pair of protrusion parts 22a, 22b, which is positioned at a forward portion in the turning direction, is brought into contact with first rib 33a.

When focus ring 2 is further turned, a part on which protrusion 22 of focus ring 2 is formed is flexed and protrusion part 22a overstrides first rib 33a. As a result, first rib 33a reaches a region between protrusion parts 22a and 22b.

Figure 6:
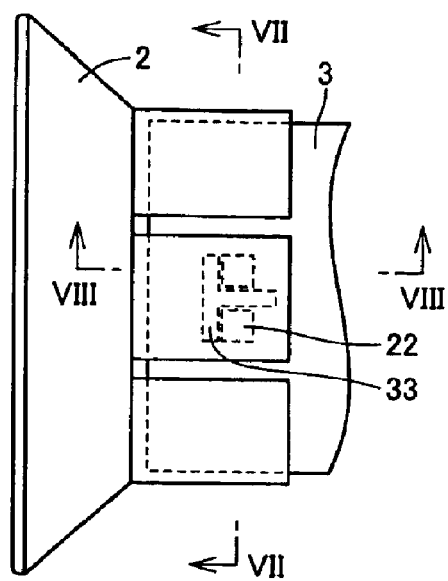
FIG. 6 is a third view for describing the procedure of attaching the focus ring in the same embodiment.
Figure 7:
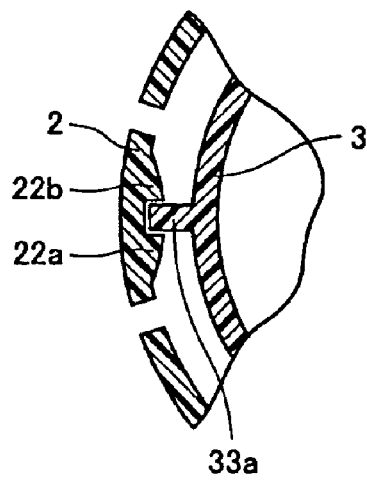
FIG. 7 is a sectional view taken along line VII—VII of FIG. 6 in the same embodiment.

With this structure, as shown in FIGS. 6 and 7, first rib 33a is sandwiched between protrusion parts 22a and 22b, so that the turning operation of focus ring 2 is restricted in the circumferential direction.

Figure 8:
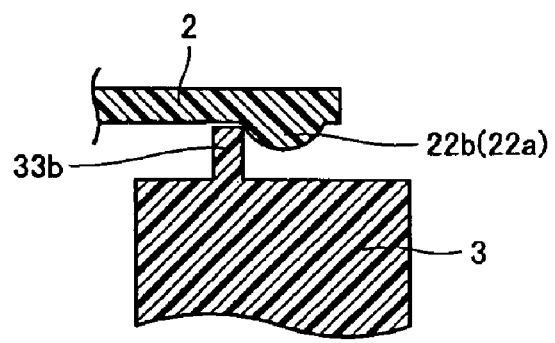
FIG. 8 is a sectional view taken along line VIII—VIII of FIG. 6 in the same embodiment.

Further, in this state, as shown in FIG. 8, second rib 33b is brought into contact with a backward portion of the pair of protrusion parts 22a, 22b in the insertion direction, so that focus ring 2 is engaged with projection ring 3 along the optical axis.

With this structure, the movement of focus ring 2 along the optical axis is restricted, thereby preventing focus ring 2 from easily detaching from projection ring 3. Thus, focus ring 2 is attached and fixed to projection ring 3.

As shown in FIG. 8, since protrusion parts 22a, 22b are formed in the shape of approximately arc along the optical axis, focus ring 2 can be comparatively easily detached from projector 1 by pulling focus ring 2 in a direction opposite to the attachment direction.

With the above-described focus ring 2 of projector 1 and projection ring 3, focus ring 2 is inserted into a prescribed position of projection ring 3 at an optional position without specifying a position of protrusion 22 formed on focus ring 2 in the circumferential direction. In addition, by turning focus ring 2, first rib 33a is sandwiched between protrusion parts 22a and 22b and, also, second rib 33b is engaged with the pair of protrusion parts 22a, 22b. As a result, focus ring 2 can be easily fixed to projection ring 3.

As described above, in projector 1 in which focus ring 2 is fixed to projection ring 3, projection ring 3 can be easily turned and focusing can be achieved as compared with the case where focus ring 2 is not attached thereto.

Figure 9:
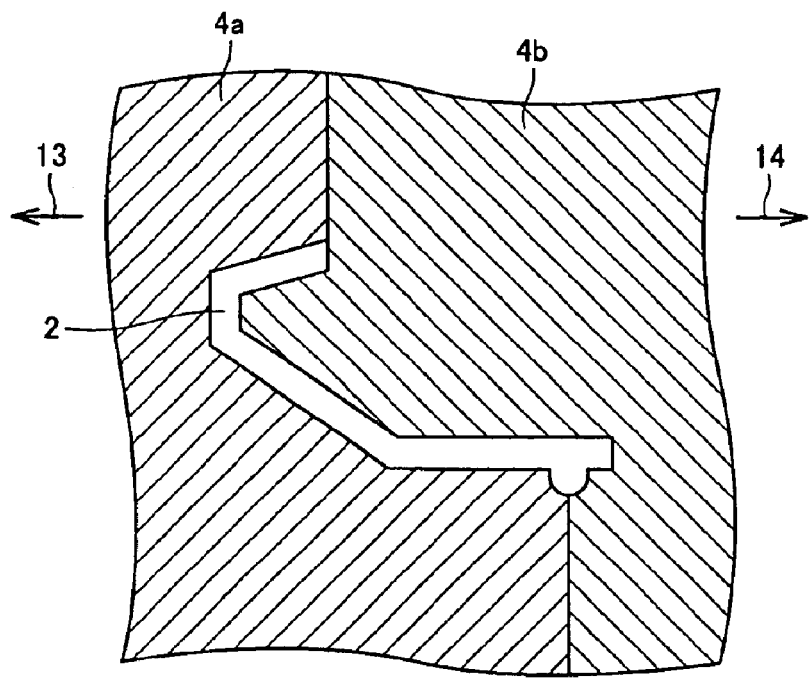
FIG. 9 is a sectional view showing dies for molding the focus ring in the same embodiment.
Figure 10:
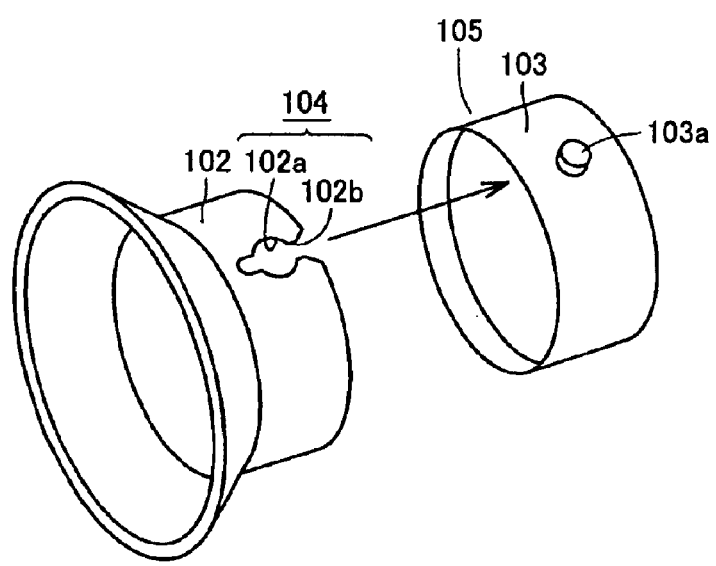
FIG. 10 is a perspective view showing a focus ring of a conventional projector.
Figure 11:
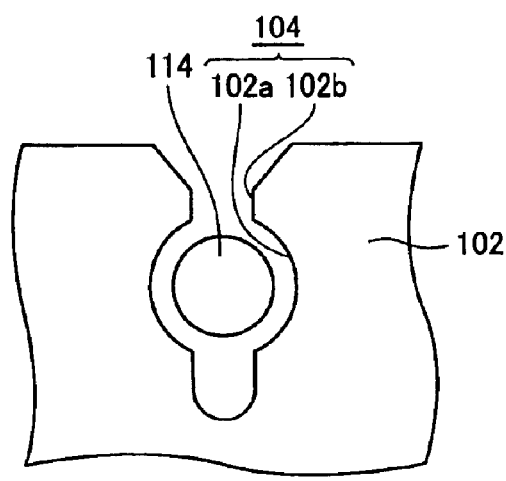
FIG. 11 is a partly enlarged view showing a die used at molding a conventional focus ring.
Figure 12:
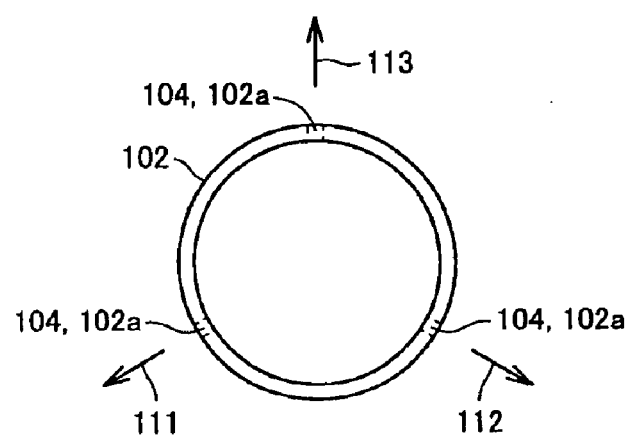
FIG. 12 is view showing detachment directions of the die used at molding the conventional focus ring.

In addition, in focus ring 2 described above, two dies 4a, 4b capable of separating from each other in a portion corresponding to a protrusion and a portion corresponding to an outer end portion of the focus ring can be used as a die for molding focus ring 2 as shown in FIG. 9.

In two dies 4a, 4b, it is sufficient that dies 4a and 4b are detached from each other in directions shown by arrow marks 13 and 14, respectively, after molding focus ring 2, and there is no necessity of detaching dies in three directions like conventional dies. Therefore, dies can be simply structured.

Further, resin having heat resistance, e.g., polycarbonate, is desirably used as the resin for focus ring 2. The resin make it possible to suppress focus ring 2 from easily deforming due to the heat generated at the time of projecting a picture.

In the above-described projector, the description has been given of the case where protrusion 22 is provided on focus ring 2 and rib 33 is provided on projection ring 3; however, a projector having a structure in that a rib is provided on focus ring 2 and a protrusion is provided on projection ring 3 may be employed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A projector for projecting a picture on a surface to be projected, comprising:

a projector main body;

a lens unit for projecting a picture;

a cylindrical focus ring inserted along a direction in which an optical axis of said lens unit extends, attached in such a manner as to surround an outer periphery of said lens unit in a circumferential direction, and molded with resin;

a first rib, provided on the outer periphery of said lens unit, extending along a direction in which said optical axis extends and a second rib, brought into contact with one end of said first rib, extending along a direction approximately orthogonal to said first rib so as to have one side and the other side; and a pair of protrusion parts provided on an inner periphery of said cylindrical focus ring, and arranged with a spacing in a direction approximately orthogonal to the direction in which said optical axis extends, wherein said first rib is sandwiched between said pair of protrusion parts in the circumferential direction and, also, said second rib is engaged with said pair of protrusion parts along said optical axis, whereby said focus ring is fixed to said lens unit.

2. A projector for projecting a picture on a surface to be projected, comprising:

a lens unit for projecting a picture;

a cylindrical focus ring inserted along a direction in which an optical axis of said lens unit extends, and attached in such a maimer as to surround an outer periphery of said lens unit in a circumferential direction, wherein one selected from the focus ring and the lens unit comprises a first rib extending parallel to the optical axis and the other selected from a focus ring and a lens unit comprises a pair of protrusion parts configured to operatively interact with the first rib such that the first rib is sandwiched between the protrusion parts.

3. The projector according to claim 2, wherein said focus ring is molded with resin.

4. A projector for projecting a picture on a surface to be projected, comprising:

a lens unit for projecting a picture;

a cylindrical focus ring inserted along a direction in which an optical axis of said lens unit extends, and attached in such a manner as to surround an outer periphery of said lens unit in a circumferential direction, wherein one portion of one of said focus ring and said lens unit is sandwiched between another portions of one of said focus ring and said lens unit and, also, said one portion is engaged with said another portions along said optical axis, whereby said focus ring is fixed to said lens unit a first rib extending along the direction said optical axis extends and a second rib, brought into contact with one end of said first rib, extending along a direction approximately orthogonal to said first rib so as to have one side and the other side are formed on said one portion, and a pair of protrusion parts arranged with a spacing in a direction approximately orthogonal to the direction in which said optical axis extends is formed on said another portions.

5. The projector according to claim 4, wherein said pair of protrusion parts is formed in the shape of approximately arc along said optical axis.

6. The projector according to claim 5, wherein said resin is heat-resistant.

* * * * *